United States Patent

Holliday

[15] 3,697,879

[45] Oct. 10, 1972

[54] ON-OFF PULSE TIME CONTROL

[72] Inventor: Jack D. Holliday, Commack, N.Y.

[73] Assignee: Eltee Pulsitron

[22] Filed: Aug. 31, 1971

[21] Appl. No.: 176,538

[52] U.S. Cl. ....................328/61, 307/226, 307/260, 307/265, 307/269, 307/293, 328/45, 328/48, 328/63

[51] Int. Cl. ............................H03k 1/00, H03k 3/04

[58] Field of Search......307/225, 226, 260, 265, 269, 307/293; 328/45, 48, 60–63

[56] References Cited

UNITED STATES PATENTS 3,388,346 6/1968 Roof et al. .............307/293 X 3,486,044 12/1969 Hirsch .......................307/293

*Primary Examiner*—Stanley D. Miller, Jr.

*Attorney*—Clarence A. O'Brien et al.

[57] ABSTRACT

An on-off pulse time control comprising a pulse generator providing a source of time base pulses to on and off timer circuits each of which includes a set of counters for producing a time signal upon completion of a pre-selected time interval. The output of each counter is connected to an inverter gate which provides a logical true signal to a synchronization gate associated with each timer. The outputs of the synchronization gates are applied to a flip flop circuit which resets one timer and simultaneously sets the other timer to initiate its time interval, thus providing a continuous on-off timed cycle.

15 Claims, 4 Drawing Figures

Jack D. Holliday

INVENTOR.

BY Clarence A. O'Brien and Harvey B. Jacobson
Attorneys

PATENTED OCT 10 1972

3,697,879

SHEET 2 OF 3

Jack D. Holliday

INVENTOR.

BY Clarence A. O'Brien and Harvey B. Jacobson

Attorneys

Jack D. Holliday

INVENTOR.

BY Clarence A. O'Brien and Harvey B. Jacobson Attorneys

ON-OFF PULSE TIME CONTROL

The present invention is generally related to timers and, more particularly, to high precision electronic pulse timers for use with electric discharge machinery or the like.

In the past, a variety of electronic timers has been provided. Such constructions, however, either have been limited to a single output time interval or have lacked the degree of precision required for electrical discharge machining processes.

It is an object of the present invention to provide a novel electronic timer which is capable of producing precise timing pulses in settable increments of time corresponding to consecutive on and off time intervals.

Another object of the present invention is to provide a versatile electronic pulse timer to produce precise pulse time frames to turn on and off logic, low level devices, and power devices associated with electrical discharge machining applications.

It is a further object of the present invention to provide a unique on-off pulse time control for use with electric discharge machining and the like and being comprised of solid state components to provide an extremely compact, yet, highly reliable and precise timer circuit.

Figure 1:
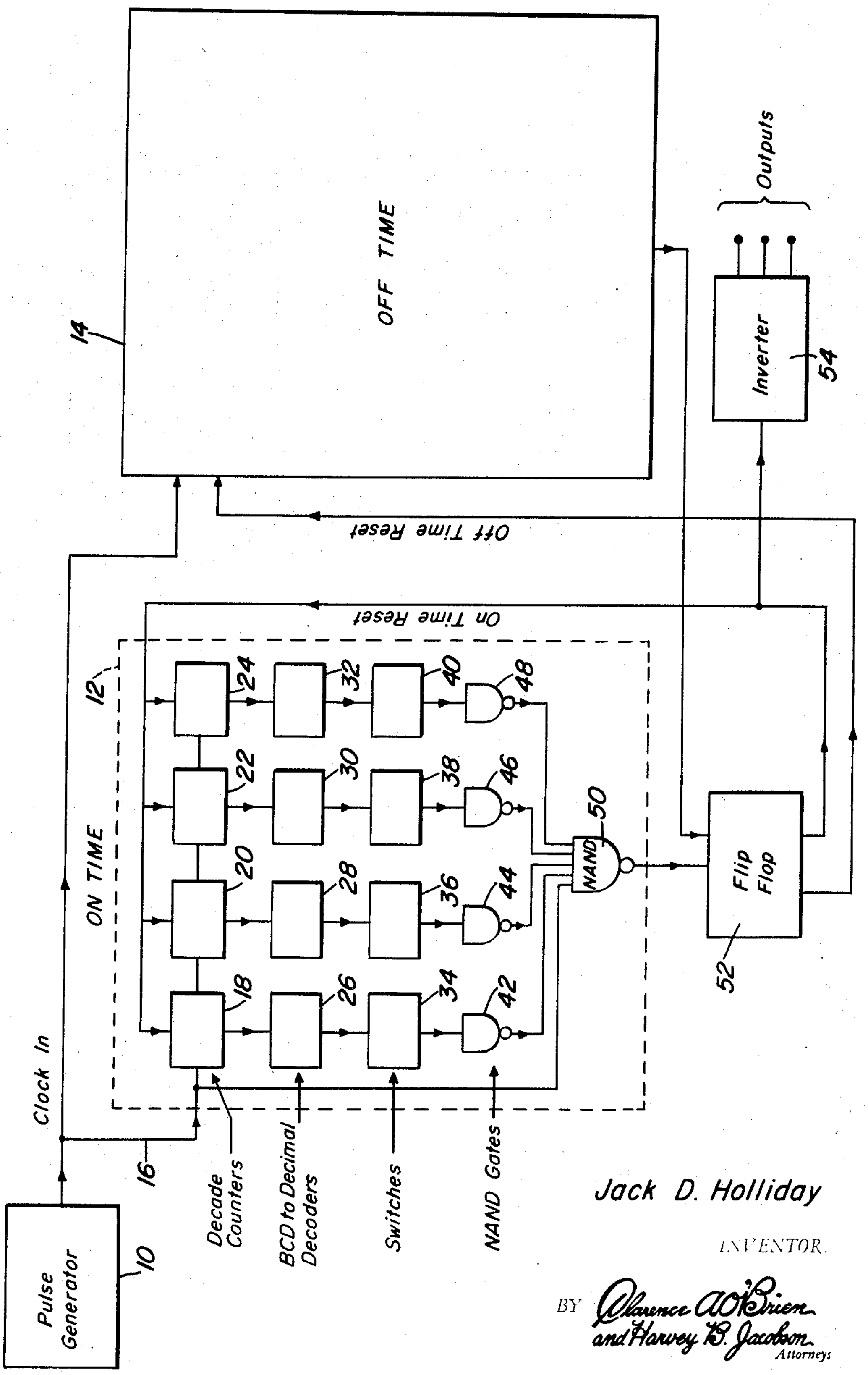

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a block diagram of the on-off pulse time control of the present invention.

FIGS. *2a* and *2b* are a schematic diagram of the circuitry associated with the present invention.

Figure 3:
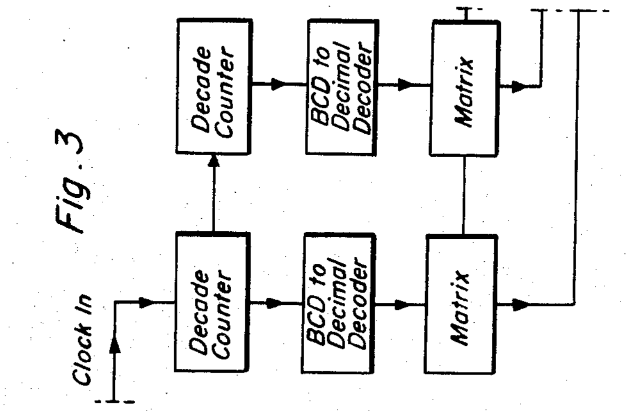

FIG. 3 is a partial block diagram illustrating an alternate form of the output circuitry associated with the counters utilized with the present invention.

Referring now, more particularly, to FIG. 1 of the drawings, a general understanding of the operation of the pulse timer of the present invention may be had. It will be appreciated, that while the present invention is intended for use with electrical discharge machinery, it is not limited to such use and may be utilized in any application requiring precision on-off pulse time intervals. The circuitry of the present invention is provided with a pulse generator, indicated by the numeral 10, which provides a pulse signal of predetermined frequency to on and off timers 12 and 14, respectively. In the preferred embodiment, the on and off timers are both identical in construction, the block diagram of the on timer components only being illustrated for the sake of clarity. The time base pulses from pulse generator 10 are fed through line 16 to a plurality of decade counters 18, 20, 22, and 24 which provide binary outputs which are fed to binary coded decimal to decimal decoders 26, 28, 30, and 32. A plurality of thumbwheel switches 34, 36, 38, and 40 are provided for selecting the desired time interval for the on time pulse. Of course, switches other than thumbwheel switches, such as toggle switches or rotary deck switches may be utilized if desired. The outputs of the switches are applied to inverting NAND gates 42, 44, 46, and 48 to provide a logical true signal to synchronization gate 50.

The outputs of the synchronization gates associated with the on and off timer sections are fed to a set-reset flip flop circuit indicated by the numeral 52. The outputs of the flip flop circuit are in turn connected to the decade counters associated with the on and off timers, and to an output inverter circuit 54. Upon completion of the on time interval, sychronization gate 50 is switched to the zero mode, which in turn sets the flip flop circuit 52 to turn off the on timer and to initiate the timing interval of the off timer. Conversely, when the off timer completes its count of the off time interval, it resets the flip flop circuit to turn off the off timer and to restart the on timer to run for its preselected time interval. Thus, it will be appreciated, that the present invention provides a means for simultaneously starting and stopping a pair of electronic timers, such that continuous on and off time pulses may be provided to produce corresponding on and off output signals which may be utilized for the control of electrical discharge machinery and the like.

Figure 2A:
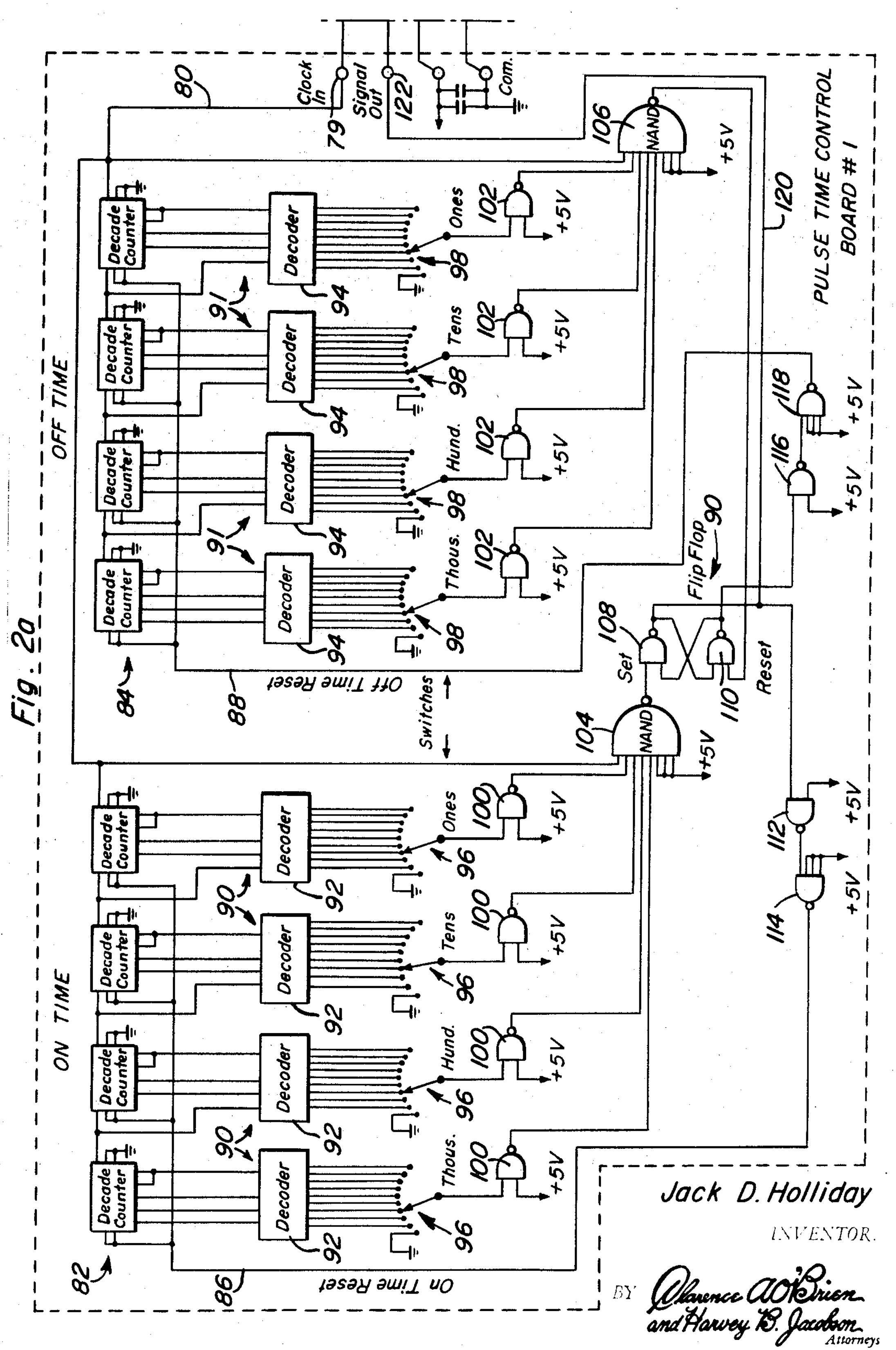
Figure 2B:
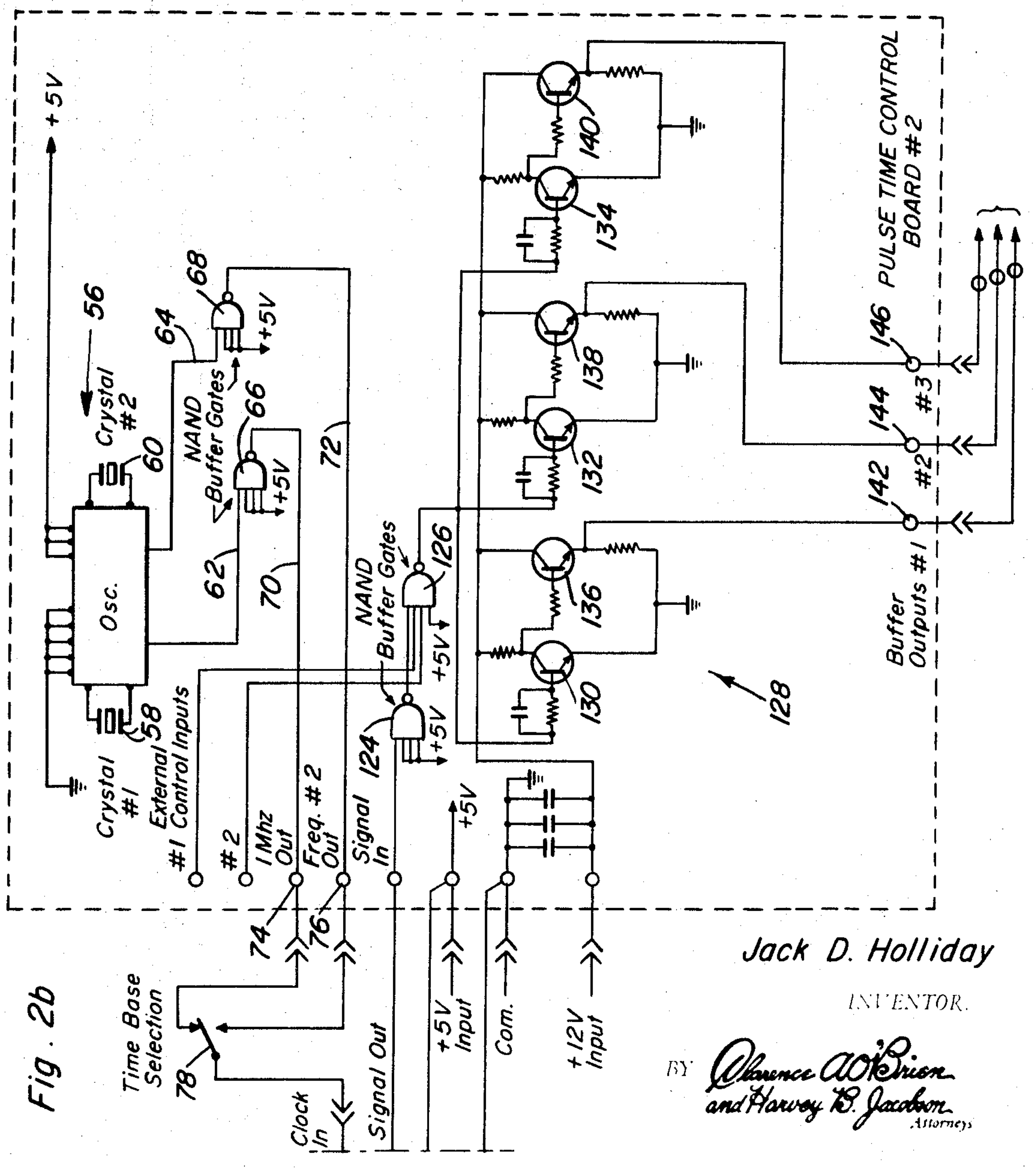

Referring now to FIGS. 2*a* and 2*b*, the circuitry of the present invention may be seen in more detail. The pulse generator indicated by the numeral 10 in the block diagram of FIG. 1 includes an oscillator circuit generally indicated by the numeral 56 which, preferably, utilizes an integrated circuit in the crystal controlled mode. Two independent crystals 58 and 60 are provided with the oscillator of the preferred embodiment, it being foreseeable that this circuitry may be expanded to include additional crystal selections. The oscillator circuit 56 provides rectangular pulses of frequencies determined by crystals 58 and 60, respectively, these pulses being fed through output lines 62 and 64 to NAND buffer gates 66 nd 68. The output lines 70 and 72 of buffer gates 66 and 68, respectively, are connected to output terminals 74 and 76, respectively, for connection to a time base selection switch indicated by the numeral 78. In the preferred embodiment, output terminal 74 is provided with a 1Mhz, while terminal 76 is provided with a second frequency, the value of which may be selected to suit the needs of the particular application.

A "clock-in" pulse signal is provided through time base selection switch 78 through terminal 79 located on a second circuit board. The time base pulse signal is fed through line 80 to a plurality of on and off time decade counters generally indicated by the numerals 82 and 84, respectively. Each of the decade counters is of a conventional, commercially available type, and is not intended to form a part of the present invention. Each counter is such that it will not perform a counting function until it is enabled by a logic signal of the proper mode. When the flip flop circuit provides a zero logic signal to the decade counters, the counters are enabled and the timing interval and counting function is initialed. This is hereinafter referred to as the "Set" mode. Conversely, a "1" logic signal to the counters terminates the counting function and resets the counter to zero. This will be referred to as the "Reset" mode. The Set and Reset signals are provided to the decade counters through lines 86 and 88 which are connected to the flip flop circuit generally indicated by the numeral 90.

With the arrangement of the flip flop circuit, no more than one set of the decade counters may be enabled at any one time. For example, when the on time decade counters 82 are enabled or in the Set mode, the off time decade counters 84 remain in the Reset mode. Assuming that the on time decade counters 82 are in the Set mode, the time base pulse signal, or "clock-in" signal, is counted by the decade counters, each of which provides an output in the form of a four-line binary coded decimal, these lines being generally indicated by the numeral 90 (91 for the off timer). A plurality of binary coded decimal to decimal decoders 92 nd 94 are provided for the on and off timers, respectively. These decimal decoders are of the conventional type and convert the binary coded decimal pulses received from each decade counter to a decimal equivalent pulse. The output of each decimal decoder is fed to a time interval selector switch 96 in the on timer, or 98 in the off timer section. These switches may be of the rotary deck, toggle, or thumbwheel type, the thumbwheel type being illustrated in FIG. 2*a*. The switches are arranged to provide selections in decades of 1's, 10"s, 100's, and 1,000's in both the on and off timer sections, the switch position determining the time interval of the pulse output from the on or off timer sections.

The outputs from the switches are applied to inverting gates 100 and 102 in the on and off time sections, respectively, to provide a logical true signal to NAND synchronization gates 104 and 106. The outputs of the synchronization gates 104 and 106 are supplied to the inputs of Set-Reset flip flop 90 which is comprised of a pair of NAND gates 108 and 110. The output of gate 108 is fed through an inverter gate 112 and buffer gate 114 back to the on time decade counters 82 by way of line 86. Similarly, the output of gate 110 is fed to the off time decade counters 84 by way of inverter and buffer gates 116 and 118, respectively.

The output of gate 108 is also fed through line 120 to signal out terminal 122 to the anciliary circuit board (FIG. 2*b*) where the oscillator is located. The signal is fed through a pair of NAND buffer gates 124 and 126 to an output circuit generally indicated by the numeral 128. The buffer gates provide sufficient drive to the output circuit transistors, the signal being fed to inverting transistors 130, 132, and 134. The signals are then fed to emitter-follower configured transistors 136, 138, and 140 to provide low impedance timed output signals to terminals 142, 144, and 146 to drive external circuitry, such as that associated with electrical discharge machining applications.

Operation of the gate logic may be explained as follows. Assuming that the on timer section is in the counting process, and that the decade counters are in the Set mode, each of the inverter gates 100 will be in the "0" mode until the decade counter with which it is associated has counted the number of pulses required by the corresponding thumb switch 96. Upon completion of the time interval associated with each decade counter, the corresponding inverter gate mode is switched to "1". Thus, when the entire time interval for the on timer section has been completed, all inverter gates 100 will be in the "1" mode. With all inverter gates 100 in the "1" mode, NAND gate 104 is switched to the "0" mode. This, in turn, switches NAND gate 108 to the "1" mode, this signal being passed through line 120 for processing by output circuit 128 to indicate that the on time interval has been completed. In addition, the "1" signal mode of gate 108 is fed to the input of flip flop gate 110 to switch it to the "0" mode, this signal being fed to the off time decade counters 84 through inverter and buffer gates 116 and 118 to initiate the off time interval. Also, the output of gate 108 is fed to the on time decade counters 82 through inverter and buffer gates 112 and 114 to terminate the counting function and provide a Reset signal to the decade counters. While in the Reset mode, decade counters 82 are disenabled and remain in such state until the off time interval has been completed. Upon completion of the off time interval, the flip flop mode is reversed and the cycle is repeated. Thus, it will be appreciated that the present invention provides a unique means of simultaneously switching between the on and off timer sections to provide continuous pulse signals of preselected width.

Referring now to FIG. 3, an alternate form of the present invention may be seen. While the first embodiment of the present invention utilizes switches, such as thumbwheel switches, the output signals from each decimal decoder may be fed into a matrix to provide digital readout control or computer control. The matrix may also utilize paper and magnetic tape control or programmed cards. When utilizing the matrix, the simultaneous Set and Reset functions may still be utilized, the matrix supplying the required signal rather than the switches illustrated in FIG. 2*a*.

It will be appreciated that by providing for decade counters in each timer section a selection range of 1–9999 is available for the on and off time intervals. The length of each time interval, of course, is determined upon the frequency of the time base and the oscillator crystal which is selected. For example, if a 1MHz crystal is used, the time interval selections will range from 1–9999 micro-seconds for the on and off time. It should be noted that, when necessary, additional decade counters may be cascaded in each timer section, thereby increasing the time interval selection range. It will also be appreciated that the use of high speed NAND circuitry provides for extremely precise measurement of each time interval, the logic switching being extremely fast.

It should be noted that the circuitry of the present invention permits continuous selection of the on or off time intervals during operation of the external circuitry. For example, if a time interval selection change is made during the on time interval, one of the thumbwheel switches will momentarily pass between two decimal number locations thus creating a logical "0" condition, which will produce a 0 Vdc at each of the three buffer outputs. This operation, in effect, protects the external circuitry and operations from uncontrolled dc switching levels.

From the foregoing description, it will be appreciated that the pulse time control of the present invention provides an extremely precise means of time interval switching, and at the same time permits a high degree of flexibility by time base selection and a wide range of time interval selections. The use of integrated circuits throughout the timer circuitry results in an extremely compact, yet, highly reliable control comprised of a relatively small number of commercially available standard electronic components. Furthermore, there are no mechanical devices, other than the selector switches, when used, to achieve the desired result.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, a source of recurring electrical pulses timing means comprising first and second counting means for counting said pulses to produce first and second time signals respectively upon completion of first and second preselected time intervals, said first and second counting means each having set and reset states for initiate and terminate counting by said counting means, first and second gate means enabled by completion of said first and second time intervals respectively, and third gate means responsive to the modes of said first and second gate means for providing a reset signal to one of said counting means and a set signal to the other of said counting means upon completion of a preselected time interval of said one counting means, said set signal enabling the other of said counting means to initiate counting of its preselected time interval.

2. The combination set forth in claim 1 wherein said first and second counting means each include a plurality of cascaded binary counters, a decimal decoder connected to each of said binary counters for providing a decimal output equivalent to the binary output of the associated binary counter and bistable gate means associated with each decimal decoder for enabling said first and second gate means when the counters associated therewith have counted the preselected time interval.

3. The combination set forth in claim 2 wherein said first and second gate means include first and second NAND circuit means respectively each connected to the associated outputs of said bistable gate means, the state of each NAND circuit means being changed only when all of the bistable gate means associated therewith are enabled by the completion of a preselected time interval.

4. The combination set forth in claim 2 wherein said third gate means includes a bistable flip flop circuit having a first output of one logic mode connected to the decade counters associated with said first timing means and a second output of the opposite logic mode connected to the decade counters associated with said second timing means, the logic mode of the flip flop being effective to set and reset said decade counters.

5. The combination set forth in claim 4 wherein said first and second gate means include first and second NAND circuit means respectively each connected to the associated outputs of said bistable gate means, the state of each NAND circuit means being changed only when all of the bistable gate means associated therewith are enabled by the completion of a preselected time interval, said NAND change circuit means being effective to change the state of said flip flop circuit upon completion of a time interval.

6. The combination set forth in claim 5 together with buffer gate means between each flip flop output and said decade counters.

7. A timer for providing time output signals, said timer comprising a frequency source of recurring time base electrical pulses, timing means comprising first and second settable counting means for counting said pulses to produce first and second time signals respectively upon completion of corresponding preselected time intervals, said first and second counting means each having a reset state for resetting to zero, gate means responsive to the completion of said preselected time intervals for simultaneously resetting one of said counting means upon completion of its count and setting the other of said counting means to initiate its count, and output circuit means connected to said gate means for processing the signals therefrom to provide said timed output signals.

8. The timer set forth in claim 7 wherein said gate means includes first and second bistable gate means enabled by said first and second counting means respectively upon completion of the associated preselected time interval.

9. The timer set forth in claim 8 wherein said gate means further includes flip flop circuit means connected to the outputs of first and second bistable gate means and being effective to simultaneously change the states of said bistable counting means in response to a change in state of either said first or second bistable gate means due to the completion of a time interval.

10. The timer set forth in claim 9 wherein said first and second bistable gate means each include NAND circuit means connected to the outputs of said first and second counting means respectively, the state of said NAND circuit means being changed only by the completion of a preselected time interval.

11. The timer set forth in claim 10 wherein said output circuit includes NAND buffer gate means connected to an inverting and amplifier circuit to provide low impedence timed output signals for driving external circuitry.

12. The timer set forth in claim 10 wherein said frequency pulse source includes at least two crystals of different resonant frequency to provide corresponding time base pulses, and means for selecting the frequency of time base pulses fed to said timing means.

13. The timer set forth in claim 10 wherein said pulse source includes a NAND buffer gate connected to an oscillator output of predetermined frequency.

14. The timer set forth in claim 10 wherein said first and second counting means each include matrix means for control of said time intervals.

14. The timer set forth in claim 10 wherein said first and second counting means each include a plurality of bistable gates the outputs of which are connected to said NAND circuit means, the state thereof being changed only upon the enablement of all of said bistable gates associated therewith.

* * * * *